UNITED STATES PATENT OFFICE.

DAVID BEATTY, OF BERKELEY, CALIFORNIA, ASSIGNOR TO HIMSELF AS TRUSTEE.

COMPOSITION FOR USE IN BREAD-MAKING.

1,170,474.     Specification of Letters Patent.     Patented Feb. 1, 1916.

No Drawing.     Application filed April 21, 1914. Serial No. 833,337.

*To all whom it may concern:*

Be it known that I, DAVID BEATTY, a citizen of the United States, residing at Berkeley, in the county of Alameda and State of California, have invented new and useful Improvements in Compositions for Use in Bread-Making, of which the following is a specification.

The object of the present invention is to provide improved bread, biscuits, pancakes, and cakes in general, and a process of making the same, and also to provide an improved package of self-raising flour for making such bread and the like.

Bread heretofore made with baking powder, or self-raising flour, is objectionable as a food either on account of its leaving deposits of phosphate of lime in the tissues and arteries of the body, the hardening of which greatly tends to shorten life, or on account of the irritating action on the liver, kidneys, and intestines of the utterly useless tartrate of potash resulting from the eating of such bread.

The use of fermented bread is objectionable on account of the presence of enzyms caused by the fermentation of the bread.

Bread made by my improved process leaves no mineral or other deposits in the tissues and arteries, but has a tendency to eliminate those already in the body.

To make my improved package of self-raising flour there are first mixed together about 224 parts of flour, 8 parts of starch, 7 parts of soda, 7 parts of sugar, and 3 parts of salt. With this mixture 14 parts of a suitable shortening ingredient, preferably butter, is mixed by reducing the butter to a molten condition and spraying it into the flour while the latter is being sifted. This mixture is placed in a carton or other suitable container. 20 parts of starch and 10 parts of lactic acid are then mixed together and the mixture is allowed to stand for about ten hours. The acid starch is then mixed with 28 parts of evaporated milk. Evaporated buttermilk may be used in its place, but in this case the quantity of lactic acid will be reduced in proportion to the lactic acid in the buttermilk. This mixture of starch, lactic acid and milk is then placed in a smaller moisture-resisting cup-shaped container, made, for instance, of waxed paper or artificial parchment, and folded over at the top, so as to protect the mixture therein. This smaller container is then placed in the carton or larger container with the other contents thereof. The carton then contains all the necessary ingredients for mixing the bread except water. These ingredients will remain intact for an indefinite period, as the acid and alkali do not come in contact, being separated by the moisture-resisting container.

When it is desired to make bread, the carton is opened, the smaller container is removed, its top is opened, and the contents of said container are placed in a mixing bowl. The small container is then fully opened or extended at the top and is filled with water, which is then the correct amount to be added to the other ingredients for baking bread or biscuit. For pancakes more water should be added. This water is then discharged into the mixing bowl, and the contents of the bowl are then thoroughly mixed. It is very difficult to properly mix dry milk with water, but the addition of the 20 parts of moist starch facilitates the diffusion of the milk through the water, so that the mixture takes place almost instantaneously. The remaining contents of the carton are then placed in the mixing bowl, and the mixture is kneaded and baked in the usual manner.

I claim:—

As an article of manufacture for admixture with soda to make biscuits and the like, pure lactic acid mixed with a sufficient amount of starch to render it substantially dry.

In testimony whereof I have hereunto set my hand in the presence of two subscribing witnesses.

DAVID BEATTY.

Witnesses:
    FRANCIS M. WRIGHT,
    D. B. RICHARDS.